United States Patent [19]

Zacharczuk

[11] Patent Number: 4,708,388
[45] Date of Patent: Nov. 24, 1987

[54] DASHBOARD COVER

[76] Inventor: Walter Zacharczuk, 6459 Zelzah Ave., Reseda, Calif. 91335

[21] Appl. No.: 4,037

[22] Filed: Jan. 16, 1987

[51] Int. Cl.⁴ .............................................. B60J 9/00
[52] U.S. Cl. .................................. 296/97 B; 296/97 E
[58] Field of Search ...................... 296/97 E, 97 B, 70; 160/DIG. 2

[56] References Cited

U.S. PATENT DOCUMENTS

| D. 236,868 | 9/1975 | Levy | D6/332 |
| 4,109,957 | 9/1978 | Polezzi | 296/95 C |
| 4,449,747 | 3/1984 | Morgan et al. | 296/97 E |
| 4,560,245 | 12/1985 | Sarver | 296/95 C |
| 4,652,039 | 3/1987 | Richards | 296/97 R |

Primary Examiner—Robert R. Song
Attorney, Agent, or Firm—I. Michael Bak-Boychuk

[57] ABSTRACT

A foldable dashboard shield for use in screening the dashboard of a motor vehicle in formed of a thin sheet, like cardboard or one of the rigid polymers, scribed with fold lines which in one manner of folding convolve the shield into a folded stack for storage and in another manner of folding form a triangular structure. The shield may be inscribed with markings and when folded in the other manner may be used as an emergency road sign.

3 Claims, 4 Drawing Figures

DASHBOARD COVER

BACKGROUND OF THE INVENTION

1. Field of the Invention

The present invention relates to sunlight protecting devices, and more particularly to devices for screening dashboards from exposure to sunlight.

2. Description of the Prior Art

Sunshields for shielding the inside of a vehicle against sunlight have been known in the past. Typically such sunshields take the form of an opaque or reflective membrane which is deployed over the window opening, either on the inside or on the outside of a vehicle, in order to block sunlight transmission. In this form the shield is functional only when the vehicle is not used, and when the vehicle is driven the sunshield, of necessity, is removed. Quite often, however, vehicles ae driven over long distances in strong sunlight and as a result long periods of exposure occur in which sunlight directly impinges on various synthetic structures and particularly the surfaces of the dashboard. This prolonged exposure results in chemical changes in the polymer structure forming the dashboard with consequent permanent damage thereto. Thus a vehicle extensively used in sunlit climates will invariably inhibit cracks and deterioration of the resilient compounds forming the dashboard.

To limit such exposure various devices were provided in the past which in one way or another shield the synthetic polymers from prolonged exposure. Exemplary in the prior art are the shielding devices taught in U.S. Pat. Nos. 4,560,245; 4,109,957 and Des. 237,663. While suitable for their purposes, the foregoing devices provide only a single use, i.e., shielding. In consequence, the shield becomes one additional item which the operator must attend and is thus either deferred to inattention or not used at all.

Along with the many articles carried in a motor vehicle are emergency signalling devices which appear with some frequency. Thus items like flares and reflecting signs are often found in the trunks of many motor cars. There is therefore some desire to multiply the functions of any devices carried in the car and it is such a functional multiplication that is disclosed herein.

In the past sunshields were occassionally imprinted with various messages, i.e., "get help", and thus some functional expansion has been carried out. Nonetheless, these prior art multiplied functions entail compromises. Thus, for example, the sunshield imprinted in the prior art with some emergency message is useful only when placed in the vehicle.

Roadside emergencies, on the other hand, often occur at locations where earlier warning is required. Thus, the emergency gear available on the marketplace often includes free-standing reflector signs and flares which may be placed at some distance from the vehicle. This particular feature is combined with some advantage in the present invention in accordance with the description following.

SUMMARY OF THE INVENTION

Accordingly, it is the general purpose and object of the present invention to provide a dashboard screen for use with a motor vehicle which also adapts for use as a free-standing emergency reflector.

Other objects of the invention are to provide a sunshield for a motor vehicle which conveniently folds up for storage.

Yet further objects of the invention are to provide a sunshield assembly which also functions as a free-standing roadway sign.

Briefly, these and other objects are accomplished in the present invention by providing a thin sheet structure having one edge cut to the interior windshield edge of a dashboard and the other edge then follows the dashboard contour. The ends of this sheet are then tapered to pointed segments, each segment including a partial slot thereacross and a fold scribe to allow the bent insertion thereof into the gap between the dash and the windshield pillars. In addition there are further fold lines in the sheet allowing for the collapse thereof into a stacked, folded over assembly. These same fold lines are aligned to permit the joining of the two ends at the above described notches in a triangulated, free-standing structure which on the surfaces thereof may include reflective coating.

Thus, the shield can be stored in a folded-up arrangement or may be used as an erected free-standing structure displaying an emergency sign. Of course, various materials can be used for the device described herein, preferably materials like cardboard or polymer sheet. When embodied in polymer material structure, creep and distortion may be used to advantage to mate the shield with the subjacent dash structure. Additionally, various attachment techniques may be used to secure the shield to the dashboard.

DESCRIPTION OF THE PREFERRED EMBODIMENT

Figure 1:
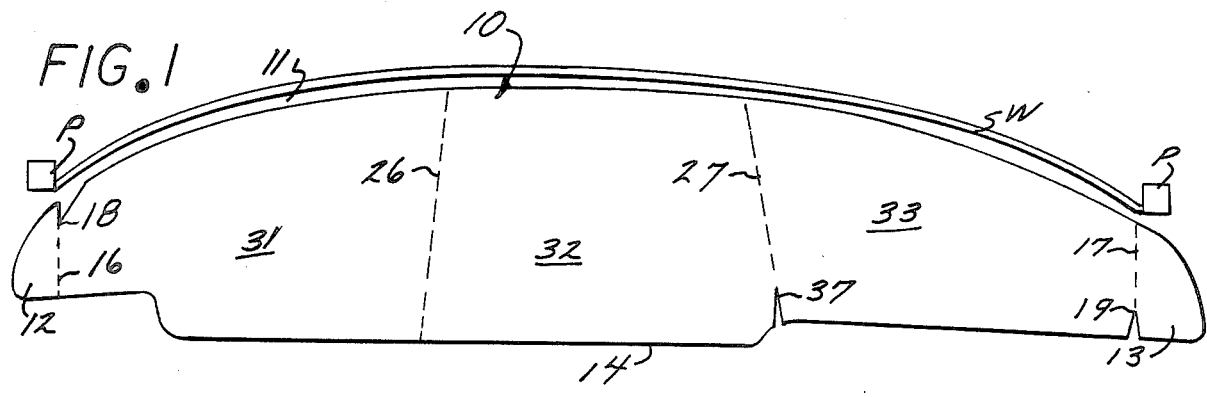
FIG. 1 is a top view of the inventive shield described herein, shown unfolded.
Figure 2:
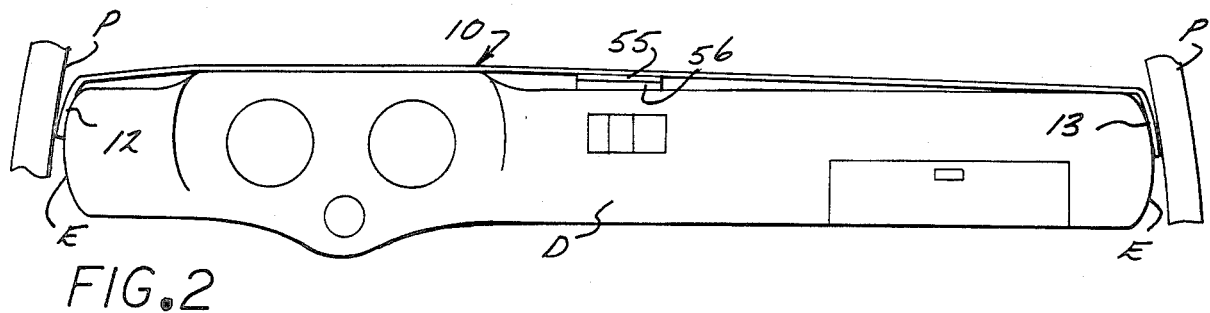
FIG. 2 is a front view of an automotive dashboard having placed thereon the inventive shield shown in FIG. 1.
Figure 3:
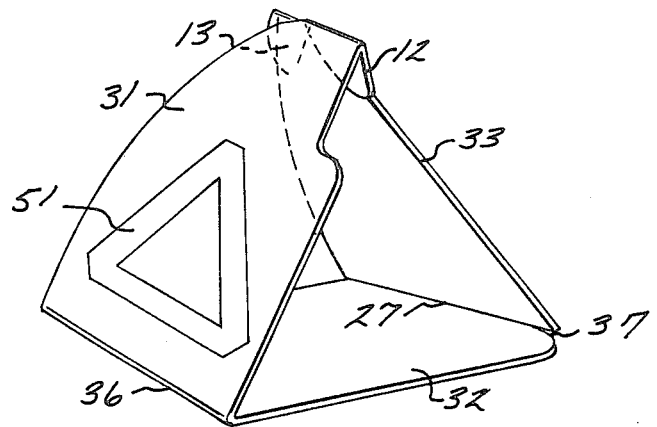
FIG. 3 is a perspective illustration of the shield shown in FIGS. 1 and 2 folded up into a triangulated structure for use as a road hazard sign.

As shown in FIGS. 1-3, the inventive shield, generally designated by the numeral 10, is formed as a thin sheet structure defined in planform by a forward edge 11 shaped to the contour of the intersection of a windshield W with the dash assembly D of a motor vehicle. In conventional practice, windshield W extends across the full width of the vehicle to terminate at the edges at the windshield pillars P of which the doors of the vehicle are hinged. In conventional practice windshield pillars P also define the interior housing dimensions of the vehicle and thus define the lateral edged E of the dashboard assembly. As a consequence, gaps exist between the edges E of the dashboard and the pillar structure into which end segments 12 and 13 of the shield 10 may be inserted by folding. These end segments are defined by the general contours of the dash assembly D as developed by the forward edge 11 of substantially arcuate form and a rearward edge 14 generally following the contour of the dashboard edge. To control the location of the folds of the end segments 12 and 13 bend the surface of the shield 10 is scribed by fold scribes 16 and 17 adjacent each end segment. the same fold scribes are selected to the top view dimension of the dashboard assembly and thus combined with edges 11 and 14 to approximate the dashboard.

For joining convenience, described in more detail hereinbelow, fold scribes or lines 16 and 17 respectively extended into slots 18 and 19 extending from edge 11 and edge 14. Moreover, matched cutouts 20 and 21 are made from the corresponding edges to each slot for further convenience in engagement according to the description below.

Figure 4:
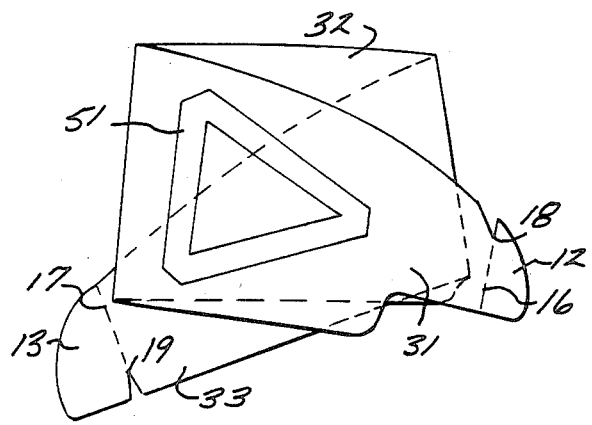
FIG. 4 is a top view of a folded over configuration of the shield shown in FIGS. 1-3 illustrating the collapse thereof for storage.

To further control the folding arrangement as shown in detail in FIGS. 3 and 4 two additional scribes are formed in the surface of shield 10 shown as scribes 26 and 27. These scribes cooperate with scribes 16 and 17 to define three panel segments in shield 10, i.e., panel segments 31, 32 and 33, with segment 32 forming the central portion. Thus, as shown in FIG. 3, panels 31 and 33 may be folded along scrbes 26 and 27 from panel 32 thereby raising the distal panels to a triangulated juncture fixed by interlocking the opposed slots 18 and 19. In consequence, a triangular structure is formed with panel 32 forming the base and panels 31 and 33 forming the other legs. This structure can then function as a free-standing device having three dimensional aspects which can then display reflective markings 51 and 53 from the underside of panel 31 and 33 to the viewer.

One should note that folding along fold scribes 26 and 27 will permit the complete collapse into a three-layered folded assembly for storage. To effect an interlocked three-layered fold up, in accordance with the illustration in FIG. 4, scribe 27 includes yet another slot 37 partially extending from edge 14 which may cooperate with slot 18 to effect an interlock. Of course, fold scribes 26 and 27 are then selected at geometric angles and spacing allowing for the folding in accordance with FIG. 4, with slot 18 engaged with slot 37 by folding over the end tab 12. In this form the folded shield is maintained as an interlocked folded assembly and thus is conveniently handled and stored in the motor vehicle.

One should note that the material structure of the instant device may be variously selected. Preferrably the shield 10 may be formed out of corrugated cardboard or other paper material with the fold scribes 16, 26, 27 and 17 effected by deforming compression. Alternatively, shield 10 may be formed of a polymer sheet that, by example, may include material structures like polyvinylchloride or polyurethane, polymers which characteristically flow with time. Such material structure will permit some flow to conform with the dashboard configuration and for that reason the shield 10 may be provided with a "Velcro" fastener tab 55 engaging a corresponding fastener 56 adhesively secured to the dashboard D.

Thus a sunscreen or shield is devised which also may function as an erected, free-standing emergency sign and futhermore may collapse into a stack, layered assembly conveniently stored in the trunk of the motor vehicle.

Obviously many modifications and changes may be made to the foregoing without departing from the spirit of the invention. It is therefore intended that the scope of the invention be determined solely on the claims appended hereto.

What is claimed is:

1. A sunshield for use in covering the dashboard of a motor vehicle, comprising:

a thin, substantially rigid, membrane of a planform generally like the planform of said dashboard, said membranes being characterized as an elongate sheet having a first and second tapered end at the longitudinal edges thereof, said first and second tapered end at the longitudinal edges thereof, said first and second ends including end fold lines for the folding thereof in a first direction to align adjacent the ends of said dashboard and in a second direction to fold over said sheet, said sheet including further a plurality of intermediate fold lines for convolving segments of said sheet relative each other, said end and intermediate fold lines being aligned to provide a stacked folding of said segments in one manner of folding and to interlock said first and second ends to each other to form a triangular structure when folded in a second manner of folding.

2. Apparatus according to claim 1 wherein:
said sheet includes light reflective markings deposited on selected portions thereof.

3. Apparatus according to claim 2 wherein:
said membrane comprises plastic material structure.

* * * * *